US 12,459,963 B2

(12) United States Patent
Asirvatham et al.

(10) Patent No.: US 12,459,963 B2
(45) Date of Patent: *Nov. 4, 2025

(54) SILOXANE DERIVATIVES OF AMINO ACIDS HAVING SURFACE-ACTIVE PROPERTIES

(71) Applicant: AdvanSix Resins & Chemicals LLC, Parsippany, NJ (US)

(72) Inventors: Edward Asirvatham, Chatham, NJ (US); Andrei Honciuc, Iasi (RO); Voichita Mihali, Basel (CH)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,102

(22) Filed: Mar. 6, 2024

(65) Prior Publication Data
US 2024/0294556 A1  Sep. 5, 2024

Related U.S. Application Data

(63) Continuation of application No. 17/230,278, filed on Apr. 14, 2021, now Pat. No. 11,952,394, which is a continuation of application No. 16/990,855, filed on Aug. 11, 2020, now Pat. No. 11,008,348.

(60) Provisional application No. 62/890,341, filed on Aug. 22, 2019.

(51) Int. Cl.
C07F 7/08 (2006.01)

(52) U.S. Cl.
CPC .................................. C07F 7/0834 (2013.01)

(58) Field of Classification Search
None
See application file for complete search history.

(56) References Cited

U.S. PATENT DOCUMENTS

| | | | |
|---|---|---|---|
| 3,515,214 A | 6/1970 | Finch | |
| 3,624,120 A | 11/1971 | Yetter | |
| 3,929,678 A | 12/1975 | Laughlin et al. | |
| 4,933,002 A | 6/1990 | Petroff et al. | |
| 5,041,590 A | 8/1991 | Snow | |
| 5,162,155 A | 11/1992 | Berndt et al. | |
| 5,707,550 A | 1/1998 | Glover et al. | |
| 5,837,045 A | 11/1998 | Johnson et al. | |
| 5,972,323 A | 10/1999 | Lang et al. | |
| 6,013,683 A | 1/2000 | Hill et al. | |
| 6,340,640 B1 | 1/2002 | Nishimoto et al. | |
| 7,622,512 B2 | 11/2009 | Schorzman et al. | |
| 10,053,619 B2 | 8/2018 | Saboowala et al. | |
| 11,008,348 B2* | 5/2021 | Asirvatham | C07F 7/0834 |
| 11,427,760 B2* | 8/2022 | Asirvatham | C09K 13/06 |
| 11,525,105 B2* | 12/2022 | Asirvatham | C11D 3/3757 |
| 11,542,428 B2* | 1/2023 | Asirvatham | C09K 8/703 |
| 11,571,377 B2* | 2/2023 | Asirvatham | A61Q 11/00 |
| 11,633,481 B2* | 4/2023 | Asirvatham | A61K 9/1611 |
| | | | 514/212.04 |
| 11,891,568 B2* | 2/2024 | Asirvatham | C09K 8/588 |
| 11,905,304 B2* | 2/2024 | Asirvatham | C07F 7/0838 |
| 11,952,394 B2* | 4/2024 | Asirvatham | C07F 7/0838 |
| 11,999,890 B2* | 6/2024 | Asirvatham | C09K 13/00 |
| 12,049,589 B2* | 7/2024 | Asirvatham | C09K 8/703 |
| 12,054,663 B2* | 8/2024 | Asirvatham | C09D 11/38 |
| 2007/0014258 A1 | 1/2007 | Tanaka | |
| 2007/0099805 A1 | 5/2007 | Phenis et al. | |
| 2007/0104778 A1 | 5/2007 | Zeng et al. | |
| 2007/0142583 A1 | 6/2007 | Schorzman et al. | |
| 2007/0213226 A1 | 9/2007 | Sieverding et al. | |
| 2008/0152540 A1 | 6/2008 | Schorzman et al. | |
| 2008/0271635 A1 | 11/2008 | Haggata et al. | |
| 2008/0274935 A1 | 11/2008 | Dingess | |
| 2009/0173912 A1 | 7/2009 | Leatherman et al. | |
| 2009/0257968 A1 | 10/2009 | Walton et al. | |
| 2010/0063310 A1 | 3/2010 | Knepper et al. | |
| 2010/0215959 A1 | 8/2010 | Jonschker et al. | |
| 2010/0233104 A1 | 9/2010 | Drake et al. | |
| 2011/0028569 A1 | 2/2011 | Leatherman et al. | |
| 2011/0158927 A1 | 6/2011 | Viravau et al. | |
| 2012/0019588 A1 | 1/2012 | Mubarekyan | |
| 2012/0093746 A1 | 4/2012 | Moriya | |
| 2013/0130508 A1 | 5/2013 | Wu et al. | |
| 2013/0331262 A1 | 12/2013 | Schnabel et al. | |

(Continued)

FOREIGN PATENT DOCUMENTS

| | | |
|---|---|---|
| BR | 112022003291 A2 | 8/2022 |
| CN | 1942531 A | 4/2007 |

(Continued)

OTHER PUBLICATIONS

Amino Acid—Britannica Online Encyclopedia (Jul. 17, 2009) (Year: 2009).
Atalay PB, Kuku G, Tuna BG. Effects of carbendazim and astaxanthin co-treatment on the proliferation of MCF-7 breast cancer cells. In Vitro Cell Dev Biol Anim. Feb. 2019; 55(2):113-119. (Year: 2018).
English Machine Translation of WO2018088142A1 ("Machine_Translation_Morikawa_WO_2018088142_A1 ") (Year: 2018).
Fluhr JW, Gloor M, Lehmann L, Lazzerini S, Distante F, Berardesca E. Glycerol accelerates recovery of barrier function in vivo. Acta Derm Venereol. Nov. 1999; 79(6):418-21. (Year: 1999).
Grgic, J., Pedisic, Z., Saunders, B. et al. International Society of Sports Nutrition position stand: sodium bicarbonate and exercise performance. J Int Soc Sports Nutr 18, 61 (2021). (Year: 2021).
International Search Report and Written Opinion received for PCT Patent Application No. PCT/US20/64345, mailed on Apr. 12, 2021, 9 pages.

(Continued)

*Primary Examiner* — Alexander R Pagano
(74) *Attorney, Agent, or Firm* — Faegre Drinker Biddle & Reath LLP

(57) ABSTRACT

The present disclosure provides siloxane derivatives of amino acids that have surface-active properties. The amino acid can be naturally-occurring or synthetic, or they may be obtained via a ring-opening reaction of a lactam, such as caprolactam. The amino acid may be functionalized with a siloxane group to form a compound that is surface-active and has surfactant characteristics. The compounds have low critical micelle concentrations (CMC) as well as the ability to lower the surface tension of a liquid.

17 Claims, 7 Drawing Sheets

(56) References Cited

U.S. PATENT DOCUMENTS

| | | | |
|---|---|---|---|
| 2014/0030206 A1 | 1/2014 | Smith et al. |
| 2014/0098167 A1 | 4/2014 | Bernard et al. |
| 2014/0362137 A1 | 12/2014 | Mann et al. |
| 2015/0004113 A1 | 1/2015 | Ritter et al. |
| 2015/0285051 A1 | 10/2015 | Miller et al. |
| 2016/0053160 A1 | 2/2016 | Nguyen et al. |
| 2016/0348488 A1 | 12/2016 | Mazyar et al. |
| 2017/0081277 A1 | 3/2017 | Boaz et al. |
| 2017/0166844 A1 | 6/2017 | Panandiker et al. |
| 2018/0057732 A1 | 3/2018 | Babcock et al. |
| 2018/0127882 A1 | 5/2018 | Reyes et al. |
| 2018/0155561 A1 | 6/2018 | Li et al. |
| 2018/0177774 A1 | 6/2018 | Kandavilli et al. |
| 2018/0193231 A1 | 7/2018 | Jung et al. |
| 2018/0362716 A1 | 12/2018 | Okamura |
| 2019/0112549 A1 | 4/2019 | Bauer et al. |
| 2019/0144737 A1 | 5/2019 | Morales et al. |
| 2019/0367760 A1 | 12/2019 | Loccufier et al. |
| 2019/0375223 A1 | 12/2019 | Rahimi et al. |
| 2020/0148831 A1 | 5/2020 | Okamura |
| 2020/0231608 A1 | 7/2020 | Okamura |
| 2021/0054002 A1 | 2/2021 | Asirvatham et al. |
| 2021/0186842 A1 | 6/2021 | Asirvatham |
| 2021/0187110 A1 | 6/2021 | Asirvatham |
| 2021/0187460 A1 | 6/2021 | Asirvatham |
| 2021/0188882 A1 | 6/2021 | Asirvatham |
| 2021/0189292 A1 | 6/2021 | Asirvatham |
| 2021/0198555 A1 | 7/2021 | Asirvatham |
| 2021/0230194 A1 | 7/2021 | Asirvatham et al. |
| 2021/0238479 A1 | 8/2021 | Asirvatham |
| 2022/0356151 A1 | 11/2022 | Boaz et al. |
| 2022/0380669 A1 | 12/2022 | Asirvatham |
| 2023/0058204 A1* | 2/2023 | Asirvatham .......... C09K 8/38 |
| 2023/0060144 A1 | 3/2023 | Liu et al. |
| 2023/0265112 A1* | 8/2023 | Asirvatham .......... C07F 7/081 |
| | | 556/450 |
| 2023/0357626 A1 | 11/2023 | Asirvatham |
| 2024/0376371 A1* | 11/2024 | Asirvatham .......... C09K 8/035 |

FOREIGN PATENT DOCUMENTS

| | | |
|---|---|---|
| CN | 101356201 A | 1/2009 |
| CN | 101959416 A | 1/2011 |
| CN | 102106792 A | 6/2011 |
| CN | 102614808 A | 8/2012 |
| CN | 103391715 A | 11/2013 |
| CN | 104826140 A | 8/2015 |
| CN | 107266487 A | 10/2017 |
| CN | 107497365 A | 12/2017 |
| CN | 107522726 A | 12/2017 |
| CN | 107597019 A | 1/2018 |
| CN | 107602862 A | 1/2018 |
| CN | 107698615 A | 2/2018 |
| CN | 108026038 A | 5/2018 |
| DE | 19746706 A1 | 11/1998 |
| EP | 0164514 A1 | 12/1985 |
| EP | 0436359 A2 | 7/1991 |
| EP | 0475130 A2 | 3/1992 |
| EP | 2024423 A2 | 2/2009 |
| EP | 1319034 B1 | 10/2011 |
| EP | 2458622 A2 | 5/2012 |
| EP | 2821429 A1 | 1/2015 |
| EP | 4017860 A1 | 6/2022 |
| GB | 1429143 A | 3/1976 |
| GB | 1470250 A | 4/1977 |
| GB | 1473201 A | 5/1977 |
| GB | 1473202 A | 5/1977 |
| JP | 53-087319 A | 8/1978 |
| JP | 03-017401 A | 1/1991 |
| JP | 03-170401 A | 7/1991 |
| JP | 04-029994 A | 1/1992 |
| JP | 08-257390 A | 10/1996 |
| JP | 2000-007942 A | 1/2000 |
| JP | 2000-095917 A | 4/2000 |
| JP | 2002-188097 A | 7/2002 |
| JP | 2004-509188 A | 3/2004 |
| JP | 2007-023017 A | 2/2007 |
| JP | 4138882 B2 | 8/2008 |
| JP | 2009-521546 A | 6/2009 |
| JP | 2009-540040 A | 11/2009 |
| JP | 2010-513991 A | 4/2010 |
| JP | 2012-102320 A | 5/2012 |
| JP | 2012-219122 A | 11/2012 |
| JP | 2013-234157 A | 11/2013 |
| JP | 2014-040598 A | 3/2014 |
| JP | 2015-501335 A | 1/2015 |
| JP | 2019-019315 A | 2/2019 |
| JP | 2022-545010 A | 10/2022 |
| JP | 2023-512408 A | 3/2023 |
| JP | 7506738 B2 | 6/2024 |
| KR | 10-1988-0009106 A | 9/1988 |
| KR | 10-2012-0038898 A | 4/2012 |
| KR | 10-2015-0108143 A | 9/2015 |
| KR | 10-2019-0103454 A | 9/2019 |
| KR | 10-2022-0114634 A | 8/2022 |
| MX | 2022002204 A | 3/2022 |
| NZ | 790445 | 7/2022 |
| NZ | 790454 | 7/2022 |
| NZ | 790464 | 7/2022 |
| TW | 201307372 A | 2/2013 |
| TW | 202112790 A | 4/2021 |
| WO | 00/26206 A1 | 5/2000 |
| WO | 02/46517 A1 | 6/2002 |
| WO | 03/93352 A1 | 11/2003 |
| WO | WO-2007075320 A2 * | 7/2007 ............ C08F 226/10 |
| WO | 2007/141565 A2 | 12/2007 |
| WO | 2008/114232 A2 | 9/2008 |
| WO | 2009/085297 A2 | 7/2009 |
| WO | 2010/076745 A1 | 7/2010 |
| WO | 2011/130460 A1 | 10/2011 |
| WO | 2014/111655 A2 | 7/2014 |
| WO | 2015/041214 A1 | 3/2015 |
| WO | 2016/191148 A1 | 12/2016 |
| WO | 2017/099709 A1 | 6/2017 |
| WO | 2018/088142 A1 | 5/2018 |
| WO | 2019/010368 A1 | 1/2019 |
| WO | 2021/003455 A1 | 1/2021 |
| WO | 2021/034550 A1 | 2/2021 |
| WO | 2021/126667 A1 | 6/2021 |
| WO | 2021/126668 A1 | 6/2021 |
| WO | 2021/126714 A1 | 6/2021 |
| WO | 2021/126715 A1 | 6/2021 |
| WO | 2021/126716 A1 | 6/2021 |
| WO | 2021/138086 A1 | 7/2021 |
| WO | 2021/158301 A1 | 8/2021 |

OTHER PUBLICATIONS

International Search Report and Written Opinion received for PCT Patent Application No. PCT/US20/64347, mailed on Mar. 10, 2021, 7 pages.

International Search Report and Written Opinion received for PCT Patent Application No. PCT/US20/64684, mailed on Mar. 25, 2021, 14 pages.

International Search Report and Written Opinion received for PCT Patent Application No. PCT/US20/64687, mailed on Mar. 31, 2021, 12 pages.

International Search Report and Written Opinion received for PCT Patent Application No. PCT/US20/64692, mailed on Apr. 7, 2021, 9 pages.

International Search Report and Written Opinion received for PCT Patent Application No. PCT/US20/66027, mailed on Apr. 7, 2021, 12 pages.

International Search Report and Written Opinion received for PCT Patent Application No. PCT/US20/66031, mailed on Apr. 8, 2021, 12 pages.

International Search Report and Written Opinion received for PCT Patent Application No. PCT/US2020/045797, mailed on Oct. 26, 2020, 11 pages.

International Search Report and Written Opinion received for PCT Patent Application No. PCT/US2023/013612, mailed on May 25, 2023, 10 pages.

(56) References Cited

OTHER PUBLICATIONS

Lauren, Susanna. "What Are Surfactants and How Do They Work?" Biol in Scientific, Jun. 26, 2018, https://www.biolinscientific.com/blog/what-are-surfactants-and-how-do-they-work. (Year: 2018).

M. Isabel Carretero, Manuel Pozo, Clay and non-clay minerals in the pharmaceutical and cosmetic industries Part II. Active ingredients, Applied Clay Science, vol. 47, Issues 3-4, 2010, pp. 171-181, ISSN 0169-1317. (Year: 2010).

Membership of the Commission, 56 Pure & Applied Chemistry, 595-624 (1984) (Year: 1984).

Mero, A.A., Hirvonen, P., Saarela, J. et al. Effect of sodium bicarbonate and beta-alanine supplementation on maximal sprint swimming. J Int Soc Sports Nutr 10, 52 (2013). (Year: 2013).

Search Report and Written Opinion received for Singapore Patent Application No. SG 11202250459C, mailed on Jan. 19, 2024, 9 pages.

Search Report received for BR Application No. 112022012216-0, mailed on Aug. 9, 2024, 4 pages (original document only).

Skokina et al., "Protective Properties of Surfactants Based on Dimethylaminoethanol", Protection of Metals, vol. 39, No. 3, May 2003, pp. 288-290.

Stanbro et al., "Cationic silicones for use in contact lens application", Polymer Preprints, 51(2), 2010, pp. 305-306.

Search Report and Written Opinion received for Singapore Patent Application No. SG 11202250257U, mailed on Apr. 1, 2025, 9 pages.

Search Report and Written Opinion received for Singapore Patent Application No. SG 11202250261Q, mailed on Apr. 1, 2025, 8 pages.

\* cited by examiner

SILOXANE DERIVATIVES OF AMINO ACIDS HAVING SURFACE-ACTIVE PROPERTIES

CROSS REFERENCE TO RELATED APPLICATIONS

This application is a Continuation of U.S. patent application Ser. No. 17/230,278, filed Apr. 14, 2021, entitled SILOXANE DERIVATIVES OF AMINO ACIDS HAVING SURFACE-ACTIVE PROPERTIES, which is a Continuation of U.S. patent application Ser. No. 16/990,855, filed Aug. 11, 2020, entitled SILOXANE DERIVATIVES OF AMINO ACIDS HAVING SURFACE-ACTIVE PROPERTIES, now issued as U.S. Pat. No. 11,008,348, which claims the benefit under Title 35, U.S.C. § 119(e) of U.S. Provisional Patent Application Ser. No. 62/890,341, filed Aug. 22, 2019, entitled SILOXANE DERIVATIVES OF AMINO ACIDS HAVING SURFACE-ACTIVE PROPERTIES, the disclosures of which are incorporated by reference herein in their entireties.

FIELD

The present disclosure pertains to siloxane derivatives of amino acids and methods for their synthesis, wherein the siloxane derivatives have surface-active properties.

BACKGROUND

Surfactants (molecules with surface-active properties) are an important class of molecules with highly sought-after characteristics. Surfactants may be uncharged, zwitterionic, cationic, or anionic. Often, these compounds are amphiphilic molecules with a water-insoluble hydrophobic "tail" group and a water-soluble hydrophilic "head" group. These compounds may adsorb at an interface, such as an interface between two liquids, a liquid and a gas, or a liquid and a solid. In the case of an interface between water and oil, the hydrophilic head group extends into the water, while the hydrophobic tail extends into the oil. When added to water, the hydrophilic head group extends into the water, while the hydrophobic tail extends into the air. The presence of the surfactant disrupts the intermolecular interaction between water molecules, replacing it with weaker interactions between water molecules and the surfactant. This results in lowered surface tension and can also serve to stabilize the interface.

At sufficiently high concentrations, surfactants may form aggregates to limit the exposure of the hydrophobic tail to the polar solvent. One such aggregate is a micelle, in which the molecules are arranged in a sphere with the hydrophobic tails inside the sphere and the hydrophilic heads on the outside to interact with a polar solvent. The effect that a given compound has on surface tension and the concentration at which it forms micelles may serve as defining characteristics for a surfactant.

Surfactants are widely used in commercial applications in formulations ranging from detergents to hair care products to cosmetics. Compounds with surface-active properties are used as soaps, detergents, lubricants, wetting agents, foaming agents, and spreading agents, among others. Thus, there is an ongoing need to identify and synthesize such compounds.

However, solely from its structure, it may be difficult to predict whether a given compound would have surface-active properties, let alone other important characteristics such as interfacial adsorption dynamics, minimum surface tension achievable, and/or ability to wet hydrophobic and/or oleophobic surfaces, which are also integral to whether the compound would become a useful surfactant. Certain amino acids and their derivatives, for example, are desirable as building blocks for surfactants, but the selection of which amino acids to use is far from intuitive. Likewise, some siloxanes are known to possess surface-active properties, but again, predicting which siloxane will be effective is highly challenging. Synthesis of such compounds adds another layer of difficulty due to the differences of solubilities attributable to different elements and moieties present in the same molecules. There remains a need for high-efficacy surfactants that can be readily synthesized at commercial scale via straightforward routes.

SUMMARY

The present disclosure provides siloxane derivatives of amino acids that have surface-active properties. The amino acids may be naturally occurring or synthetic amino acids, or they may be obtained via ring-opening reactions of molecules such as lactams, for instance caprolactam. The amino acids may be functionalized with different types of siloxane groups to form compounds with surface-active properties. Characteristically, these compounds may have low critical micelle concentrations (CMC) and/or the ability to reduce the surface tension of a liquid.

The present disclosure provides compounds of Formula I, below:

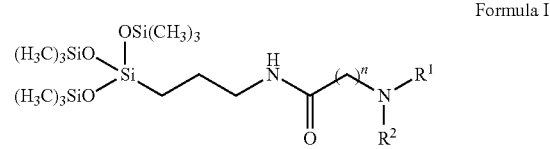

Formula I wherein $R^1$ and $R^2$ may be the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

n is an integer from 1 to 12;

the terminal nitrogen is optionally further substituted with $R^3$, wherein $R^3$ is selected from the group consisting of hydrogen, oxygen, hydroxyl, and $C_1$-$C_6$ alkyl; and an optional counterion may be associated with the compound and, if present, the counterion may be selected from the group consisting of chloride, bromide, and iodide.

Further compounds provided by the present disclosure are compounds of Formula Ia:

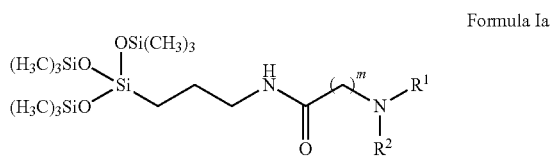

Formula Ia wherein $R^1$ and $R^2$ may be the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

m is an integer from 1 to 6; the terminal nitrogen is optionally further substituted with $R^3$, wherein $R^3$ is selected from the group consisting of hydrogen, oxygen, and $C_1$-$C_6$ alkyl wherein the alkyl chain is optionally substituted with one or more substituents selected from the group consisting of carboxyl, carboxylate, and sulfonate; and an optional counterion may be associated with the compound and, if present, the counterion may be selected from the group consisting of chloride, bromide, and iodide.

Additional compounds provided by the present disclosure are compounds of Formula Ib:

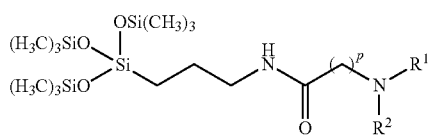

Formula Ib wherein $R^1$ and $R^2$ may be the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

p is 5;

the terminal nitrogen is optionally further substituted with $R^3$, wherein $R^3$ is selected from the group consisting of hydrogen, oxygen, and $C_1$-$C_6$ alkyl, wherein the alkyl chain is optionally substituted with one or more substituents selected from the group consisting of carboxyl, carboxylate, and sulfonate; and an optional counterion may be associated with the compound and, if present, the counterion may be selected from the group consisting of chloride, bromide, and iodide.

Still other compounds provided by the present disclosure are those compounds of Formula I wherein $R^1$ and $R^2$ are methyl.

Other compounds provided by the present disclosure are compounds of Formula I, wherein n is 5.

Still other compounds provided by the present disclosure are compounds of Formula Ib, wherein $R^1$ and $R^2$ are methyl.

Yet other compounds provided by the present disclosure are compounds of Formula Ib, wherein $R^3$ is hydrogen.

Other compounds provided by the present disclosure are compounds of Formula Ib wherein the counterion is selected from the group consisting of chloride, bromide, and iodide.

Additional compounds provided by the present disclosure are compounds of Formula Ib wherein the counterion is chloride.

Other compounds provided by the present disclosure are compounds of Formula Ib, wherein $R^3$ is methyl.

Other compounds provided by the present disclosure are compounds of Formula Ib, wherein the counterion is iodide.

Still other compounds provided by the present disclosure are compounds of Formula Ib, wherein $R^3$ is an oxygen.

Additional compounds provided by the present disclosure are compounds of Formula Ib, wherein $R^3$ is $C_1$-$C_6$ alkyl, substituted with sulfonate.

One specific compound provided by the present disclosure is 6-(dimethylamino)-N-(3-(1,1,1,5,5,5-hexamethyl-3-((trimethylsilyl)oxy)trisiloxan-3-yl)propyl)hexanamide, having the following formula:

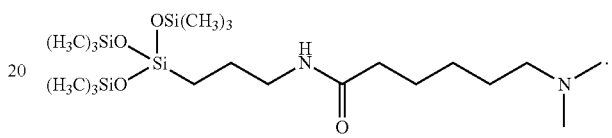

A second specific compound provided by the present disclosure is 6-(dimethylamino)-N-(3-(1,1,1,5,5,5-hexamethyl-3-((trimethylsilyl)oxy)trisiloxan-3-yl)propyl)hexaminium chloride, having the following formula:

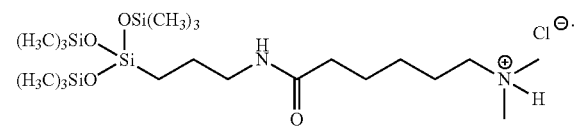

A third specific compound provided by the present disclosure is 3 6-((3-(1, 1,1,5,5,5-hexamethyl-3-((trimethylsilyl)oxy)trisiloxan-3-yl)propyl)amino)-N,N,N-trimethyl-6-oxohexan-1-aminium iodide, having the following formula:

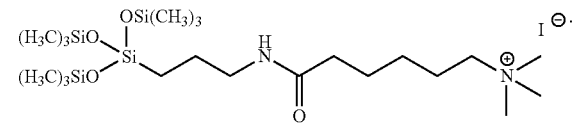

A fourth specific compound provided by the present disclosure is 6-((3-(1,1,1,5,5,5-hexamethyl-3-((trimethylsilyl)oxy)trisiloxan-3-yl)propyl)amino)-N,N-dimethyl-6-oxohexan-1-amine oxide, having the following formula:

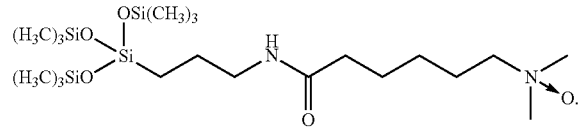

A fifth specific compound provided by the present disclosure is 4-((6-((3-(1,1,1,5,5,5-hexamethyl-3-((trimethylsilyl)oxy)trisiloxan-3-yl)propyl)amino)-6-oxohexyl)dimethylammonio)butane-1-sulfonate, having the following formula:

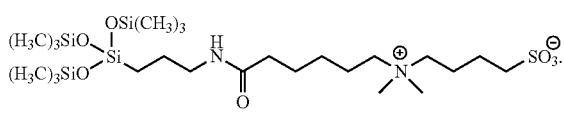

A sixth specific compound provided by the present disclosure is 5-((6-((3-(1,1,1,5,5,5-hexamethyl-3-((trimethylsilyl)oxy)trisiloxan-3-yl)propyl)amino)-6-oxohexyl)dimethylammonio)pentane-1-sulfonate, having the following formula:

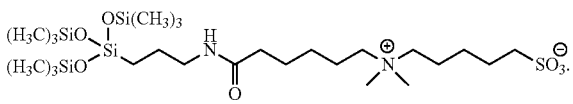

The above mentioned and other features of the disclosure, and the manner of attaining them, will become more apparent and will be better understood by reference to the following description of embodiments taken in conjunction with the accompanying drawings.

DETAILED DESCRIPTION

Figure 1:
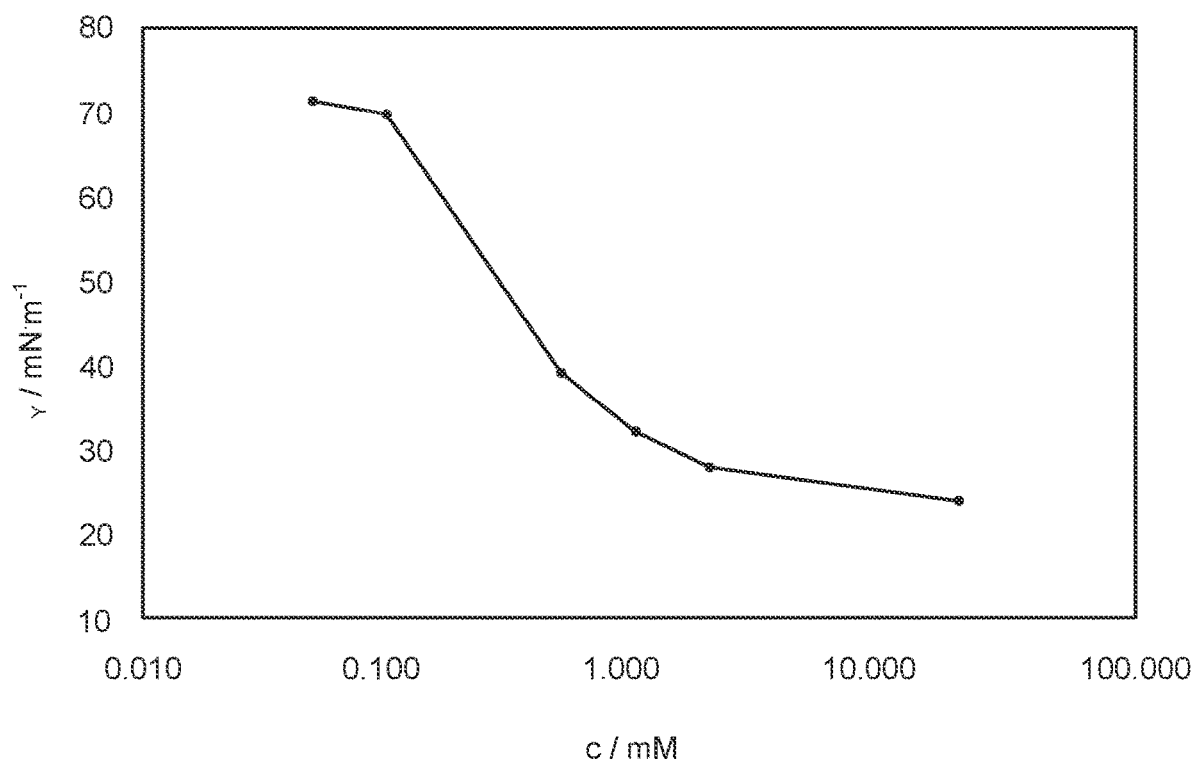
FIG. 1 shows a plot of surface tension versus concentration for Surfactant 2, with a chloride counterion measured at pH=7 as described in Example 1b.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

As used herein, the word "alkyl" means any saturated carbon chain, which may be a straight or branched chain.

As used herein, the phrase "surface-active" means that the associated compound is able to lower the surface tension of the medium in which it is dissolved, and/or the interfacial tension with other phases, and, accordingly, may be adsorbed at the liquid/vapor and/or other interfaces. The term "surfactant" may be applied to such a compound.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

The present disclosure provides siloxane derivatives of amino acids. The amino acids may be naturally occurring or synthetic, or they may be obtained from ring-opening reactions of lactams, such as caprolactam. The compounds of the present disclosure have been shown to have surface-active properties, and may be used as surfactants and wetting agents, for example. In particular, the present disclosure provides compounds of Formula I, shown below:

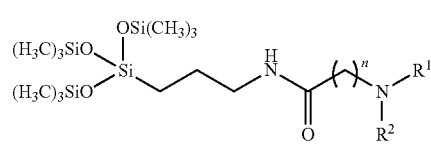

Formula I wherein $R^1$ and $R^2$ may be the same or different, and are at least one group selected from the group consisting of $C_1$-$C_6$ alkyl, optionally the $C_1$-$C_6$ alkyl may include one or more of oxygen, nitrogen, or sulfur atoms or substituents that include one or more of these atoms, the alkyl chain may be optionally substituted with one or more substituents selected from the group consisting of hydroxyl, amino, amido, sulfonyl, sulfonate, carbonyl, carboxyl, and carboxylate;

n is an integer from 1 to 12;

the terminal nitrogen is optionally further substituted with $R^3$, wherein $R^3$ is selected from the group consisting of hydrogen, oxygen, hydroxyl, and $C_1$-$C_6$ alkyl; and an optional counterion may be associated with the compound and, if present, the counterion may be selected from the group consisting of chloride, bromide, and iodide.

The present disclosure further provides for compounds of Formula Ia:

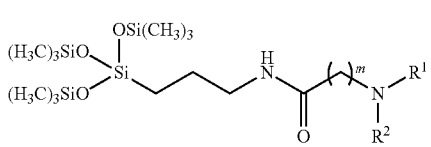

Formula Ia wherein $R^1$ and $R^2$ may be the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

m is an integer from 1 to 6;

the terminal nitrogen is optionally further substituted with R³, wherein R³ is selected from the group consisting of hydrogen, oxygen, and C₁-C₆ alkyl wherein the alkyl chain is optionally substituted with one or more substituents selected from the group consisting of carboxyl, carboxylate, and sulfonate; and an optional counterion may be associated with the compound and, if present, the counterion may be selected from the group consisting of chloride, bromide, and iodide.

The present disclosure additionally provides for compounds of Formula Ib:

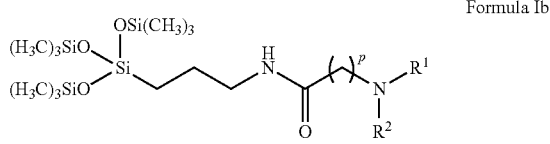

Formula Ib wherein R¹ and R² may be the same or different, and comprise at least one group selected from the group consisting of C₁-C₆ alkyl, optionally the C₁-C₆ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

p is 5;

the terminal nitrogen is optionally further substituted with R³, wherein R³ is selected from the group consisting of hydrogen, oxygen, and C₁-C₆ alkyl, wherein the alkyl chain is optionally substituted with one or more substituents selected from the group consisting of carboxyl, carboxylate, and sulfonate; and an optional counterion may be associated with the compound and, if present, the counterion may be selected from the group consisting of chloride, bromide, and iodide.

One specific compound provided by the present disclosure is 6-(dimethylamino)-N-(3-(1,1,1,5,5,5-hexamethyl-3-((trimethylsilyl)oxy)trisiloxan-3-yl)propyl)hexanamide (Surfactant 1), having the following formula:

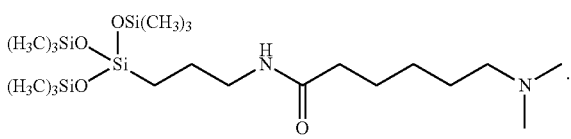

A second specific compound provided by the present disclosure is 6-(dimethylamino)-N-(3-(1,1,1,5,5,5-hexamethyl-3-((trimethylsilyl)oxy)trisiloxan-3-yl)propyl)hexaminium chloride (Surfactant 2), having the following formula:

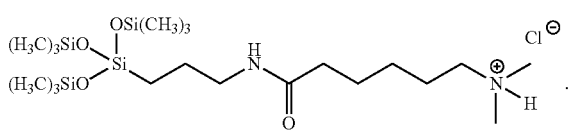

A third specific compound provided by the present disclosure is 3 6-((3-(1,1,1,5,5,5-hexamethyl-3-((trimethylsilyl)oxy)trisiloxan-3-yl)propyl)amino)-N,N,N-trimethyl-6-oxohexan-1-aminium iodide (Surfactant 3), having the following formula:

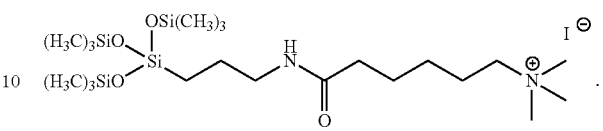

A fourth specific compound provided by the present disclosure is 6-((3-(1, 1,1,5,5,5-hexamethyl-3-((trimethylsilyl)oxy)trisiloxan-3-yl)propyl)amino)-N,N-dimethyl-6-oxohexan-1-amine oxide (Surfactant 4), having the following formula:

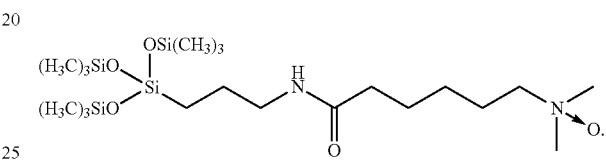

In the structure above, the notation "N→O" is intended to convey a non-ionic bonding interaction between nitrogen and oxygen.

A fifth specific compound provided by the present disclosure is 4-((6-((3-(1, 1,1,5,5,5-hexamethyl-3-((trimethylsilyl)oxy)trisiloxan-3-yl)propyl)amino)-6-oxohexyl)dimethylammonio)butane-1-sulfonate (Surfactant 5), having the following formula:

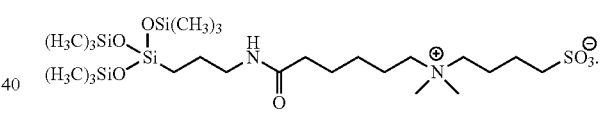

A sixth specific compound provided by the present disclosure is 5-((6-((3-(1,1,1,5,5,5-hexamethyl-3-((trimethylsilyl)oxy)trisiloxan-3-yl)propyl)amino)-6-oxohexyl)dimethylammonio)pentane-1-sulfonate, having the following formula:

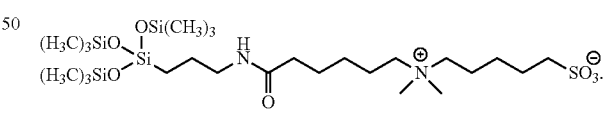

These compounds may be synthesized by various methods. One such method includes reacting an amino acid, such as an N-alkylated or N-acylated amino acid, with a siloxane to convert the amino acid C-terminus to the desired siloxane derivative. The amino acid N-terminus may be further protonated, alkylated, or oxidized to yield a quaternary amine or an N-oxide, for example.

The amino acid may be naturally occurring or synthetic or may be derived from a ring opening reaction of a lactam, such as caprolactam. The ring-opening reaction may be either an acid or alkali catalyzed reaction, and an example of an acid catalyzed reaction is shown below in Scheme 1.

SCHEME 1

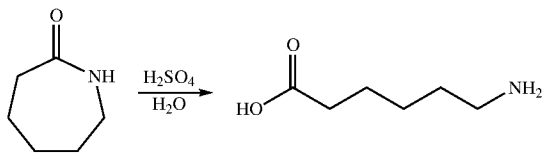

The amino acid may have as few as 1 or as many as 12 carbons between the N- and C-termini. The alkyl chain may be branched or straight. The alkyl chain may be interrupted with nitrogen, oxygen, or sulfur. The alkyl chain may be further substituted with one or more substituents selected from the group consisting of hydroxyl, amino, amido, sulfonyl, sulfonate, carboxyl, and carboxylate. The N-terminal nitrogen may be acylated or alkylated with one or more alkyl groups. For example, the amino acid may be 6-(dimethylamino)hexanoic acid.

The siloxane may be substituted with one or more alkoxy groups, such as methoxy, ethoxy, isopropoxy, tertiary butoxy, and others. The siloxane may be further substituted with one or more alkyl groups, such as propyl, wherein the alkyl group may yet be further substituted with an appropriate functional group to permit coupling of the siloxane to the amino acid, such as a nitrogen. For example, the siloxane may be 3-aminopropyltris(trimethylsiloxy)silane.

The siloxane derivative of the amino acid may be synthesized as shown below in Scheme 2. As shown, 6-aminohexanoic acid is treated with formaldehyde in formic acid at reflux to give 6-(dimethylamino)hexanoic acid. The free carboxylic acid is then coupled to 3-aminopropyl(trismethylsiloxy)silane in refluxing toluene to give the desired siloxane derivative.

SCHEME 2

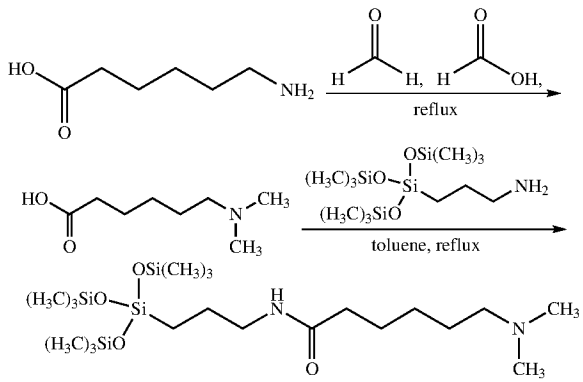

The N-terminal nitrogen may be further derivatized to modify or improve water solubility and surface-active properties. A sample synthetic scheme is shown below in Scheme 3, in which the N-terminal nitrogen is treated with hydrochloric acid to give the corresponding hydrochloride salt.

SCHEME 3

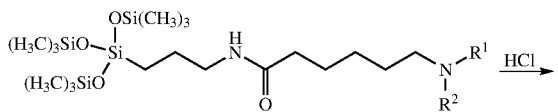

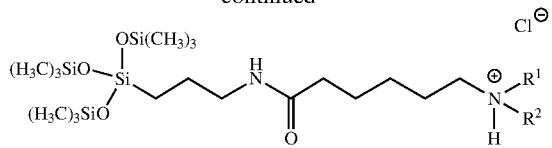

The N-terminal nitrogen may be alkylated. A sample synthetic scheme is shown below, in which the N-terminal nitrogen is treated with methyl iodide to give the corresponding quaternary amine salt.

SCHEME 4

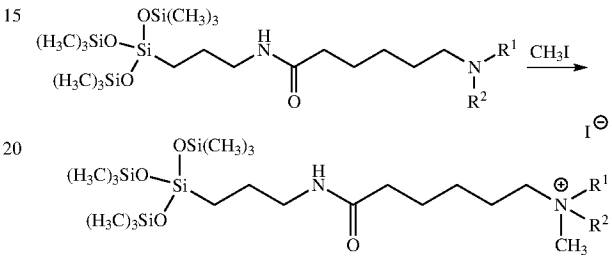

The N-terminal nitrogen may be treated with hydrogen peroxide in water at reflux to give the corresponding N-oxide, as shown in the sample synthetic scheme below, Scheme 5.

SCHEME 5

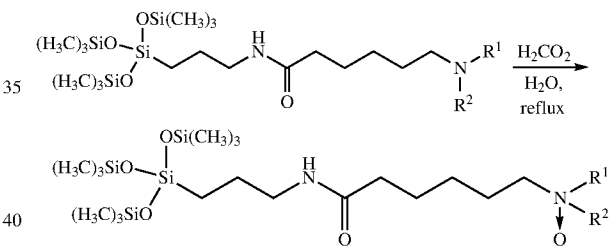

The compounds of the present disclosure demonstrate surface-active properties. These properties may be measured and described by various methods. One method by which surfactants may be described is by the molecule's critical micelle concentration (CMC). CMC may be defined as the concentration of a surfactant at which micelles form, and above which all additional surfactant is incorporated into micelles.

As surfactant concentration increases, surface tension decreases. Once the surface is completely overlaid with surfactant molecules, micelles begin to form. This point represents the CMC, as well as the minimum surface tension. Further addition of surfactant will not further affect the surface tension. CMC may therefore be measured by observing the change in surface tension as a function of surfactant concentration. One such method for measuring this value is the Wilhemy plate method. A Wilhelmy plate is usually a thin iridium-platinum plate attached to a balance by a wire and placed perpendicularly to the air-liquid interface. The balance is used to measure the force exerted on the plate by wetting. This value is then used to calculate the surface tension (Y) according to Equation 1:

$$\gamma = F/l \cos\theta \qquad \text{Equation 1}$$

wherein l is equal to the wetted perimeter (2w+2d, in which w and d are the plate thickness and width, respectively) and cos θ, the contact angle between the liquid and the plate, is assumed to be 0 in the absence of an extant literature value.

Another parameter used to assess the performance of surfactants is dynamic surface tension. The dynamic surface tension is the value of the surface tension for a particular surface or interface age. In the case of liquids with added surfactants, this can differ from the equilibrium value. Immediately after a surface is produced, the surface tension is equal to that of the pure liquid. As described above, surfactants reduce surface tension; therefore, the surface tension drops until an equilibrium value is reached. The time required for equilibrium to be reached depends on the diffusion rate and the adsorption rate of the surfactant.

One method by which dynamic surface tension is measured relies upon a bubble pressure tensiometer. This device measures the maximum internal pressure of a gas bubble that is formed in a liquid by means of a capillary. The measured value corresponds to the surface tension at a certain surface age, the time from the start of the bubble formation to the occurrence of the pressure maximum. The dependence of surface tension on surface age can be measured by varying the speed at which bubbles are produced.

Surface-active compounds may also be assessed by their wetting ability on solid substrates as measured by the contact angle. When a liquid droplet comes in contact with a solid surface in a third medium, such as air, a three-phase line forms among the liquid, the gas and the solid. The angle between the surface tension unit vector, acting at the three-phase line and tangent at the liquid droplet, and the surface is described as the contact angle. The contact angle (also known as wetting angle) is a measure of the wettability of a solid by a liquid. In the case of complete wetting, the liquid is completely spread over the solid and the contact angle is 0°. Wetting properties are typically measured for a given compound at the concentration of 1-10×CMC, however, it is not a property that is concentration-dependent therefore measurements of wetting properties can be measured at concentrations that are higher or lower.

In one method, an optical contact angle goniometer may be used to measure the contact angle. This device uses a digital camera and software to extract the contact angle by analyze the contour shape of a sessile droplet of liquid on a surface.

Potential applications for the surface-active compounds of the present disclosure include formulations for use as shampoos, hair conditioners, detergents, spot-free rinsing solutions, floor and carpet cleaners, cleaning agents for graffiti removal, wetting agents for crop protection, adjuvants for crop protection, and wetting agents for aerosol spray coatings.

It will be understood by one skilled in the art that small differences between compounds may lead to substantially different surfactant properties, such that different compounds may be used with different substrates, in different applications.

The following non-limiting embodiments are provided to demonstrate the different properties of the different surfactants. In Table 1 below, short names for the surfactants are correlated with their corresponding chemical structures.

TABLE 1

| Surfactant | Formula & Name |
|---|---|
| Surfactant 1 | 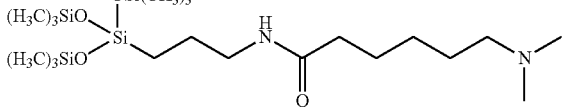<br>6-(dimethylamino)-N-(3-(1,1,1,5,5,5-hexamethyl-3-((trimethylsilyl)oxy)trisiloxan-3-yl)propyl)hexanamide |
| Surfactant 2 | 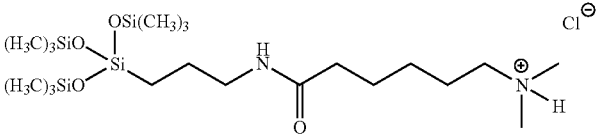<br>6-((3-(1,1,1,5,5,5-hexamethyl-3-((trimethylsilyl)oxy)trisiloxan-3-yl)propyl)amino)-N,N-dimethyl-6-oxohexan-1-aminium chloride |
| Surfactant 3 | 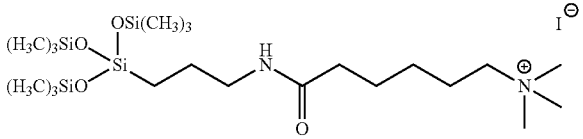<br>6-((3-(1,1,1,5,5,5-hexamethyl-3-((trimethylsilyl)oxy)trisiloxan-3-yl)propyl)amino)-N,N,N-trimethyl-6-oxohexan-1-aminium iodide |
| Surfactant 4 | 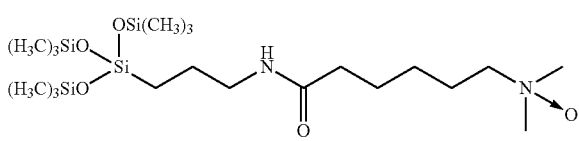 |

TABLE 1-continued

| Surfactant | Formula & Name |
|---|---|
| Surfactant 5 | 6-((3-(1,1,1,5,5,5-hexamethyl-3-((trimethylsilyl)oxy)trisiloxan-3-yl)propyl)amino)-N,N-dimethyl-6-oxohexan-1-amine oxide<br>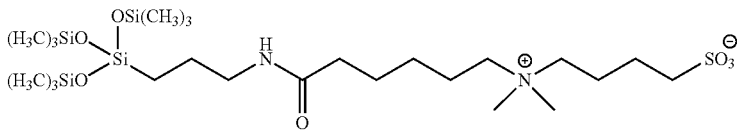<br>4-((6-((3-(1,1,1,5,5,5-hexamethyl-3-((trimethylsilyl)oxy)trisiloxan-3-yl)propyl)amino)-6-oxohexyl)dimethylammonio)butane-1-sulfonate |

Each of the five compounds are effective as surface-active agents, useful for wetting or foaming agents, dispersants, emulsifiers, and detergents, among other applications.

Surfactants 1 and 2 candidates for use in a variety of surface cleaning and personal care product formulations as foaming or wetting agents.

Surfactant 3 is cationic. These surfactants are useful in both the applications described above and some further special applications such as surface treatments, such as in personal hair care products, and can also be used to generate water repellant surfaces.

Surfactant 4 is non-ionic, and can be used in shampoos, detergents, hard surface cleaners, and a variety of other surface cleaning formulations.

Surfactant 5 is zwitterionic. These surfactants are useful as co-surfactants in all of the applications described above.

The amount of the compounds disclosed herein used in a formulation may be as low as about 0.001 wt. %, about 0.05 wt. %, about 0.1 wt. %, about 0.5 wt. %, about 1 wt. %, about 2 wt. %, or about 5 wt. %, or as high as about 8 wt. %, about 10 wt. %, about 15 wt. %, about 20 wt. %, or about 25 wt. %, or within any range defined between any two of the foregoing values.

EXAMPLES

Nuclear magnetic resonance (NMR) spectroscopy was performed on a Bruker 500 MHz spectrometer. The critical micelle concentration (CMC) was determined by the Wilhelmy plate method at 23° C. with a tensiometer (DCAT 11, DataPhysics Instruments GmbH) equipped with a Pt—Ir plate. Dynamic surface tension was determined with a bubble pressure tensiometer (Krüss BP100, Krüss GmbH), at 23° C. Contact angle was determined with the optical contact angle goniometer (OCA 15 Pro, DataPhysics GmbH) equipped with a digital camera.

Example 1a

Synthesis of 6-(dimethylamino)-N-(3-(1,1,1,5,5,5-hexamethyl-3-((trimethylsilyl)oxy)trisiloxan-3-yl)propyl)hexanamide (Surfactant 1) and 6-((3-(1,1,1,5,5,5-hexamethyl-3-((trimethylsilyl)oxy)trisiloxan-3-yl)propyl)amino)-N, N-dimethyl-6-oxohexan-1-aminium salt (Surfactant 2)

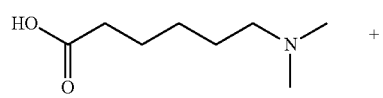

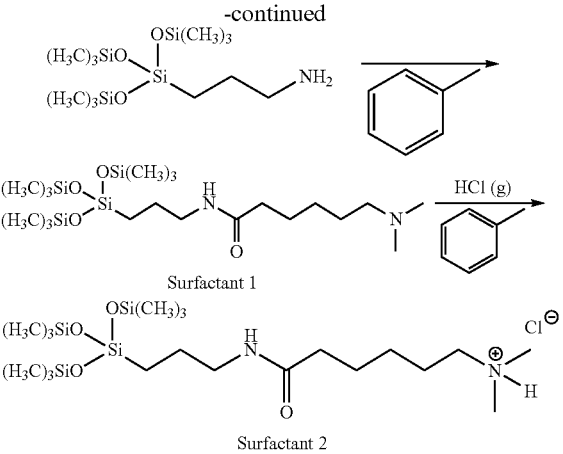

6-(Dimethylamino)hexanoic acid (2.00 g, 12.56 mmol, 1 equiv.) was dissolved in toluene (50 mL) in a 100 mL round bottom boiling flask equipped with a Dean Stark trap, then 3-aminopropyltris(trimethylsiloxy)silane (5.48 mL, 13.81 mmol, 1.1 equiv.) was added. The reaction vessel was heated, and the reaction refluxed for 24 hours until no more water separated in the Dean Stark tube. The solvent was removed under vacuum to give Surfactant 1 as a yellow oil in 94% yield. 1H NMR (500 MHz, DMSO) δ: 0.09 (s, 27H), 0.28-0.31 (m, 2H), 1.12-1.26 (m, 2H), 1.27-1.30 (m, 4H), 1.38-1.41 (m, 2H), 1.94 (t, J=7.3 Hz, 2H), 2.00 (s, 6H), 2.06-2.03 (m, 2H), 2.89 (dd, J=12.9, 6.8 Hz, 2H).

In its neutral form, Surfactant 1 is slightly soluble in pure water without addition of hydrotropes or other surfactants, but after protonation in slightly acidic conditions it becomes interfacially active (Surfactant 2). The acidic conditions can be generated by the addition of any acid or acidic buffer in the pH range of 4-7. Surfactant 2 can also be prepared in non-aqueous solutions, for example by sparging gaseous HCl in toluene in the presence of Surfactant 1.

Example 1b

Determination of Critical Micelle Concentration (CMC) of Surfactant 2

The critical micelle concentration (CMC) for Surfactant 2 was tested with a chloride counterion and was determined to be about 2 mmol. The plateau value of minimum surface tension that can be reached by this surfactant is about 23 mN/m. FIG. 1 is a plot of these results, showing surface tension versus concentration.

Example 2a

Synthesis of 6-((3-(1,1,1,5,5,5-hexamethyl-3-((trimethylsilyl)oxy)trisiloxan-3-yl)propyl)amino)-N, N, N-trimethyl-6-oxohexan-1-aminium iodide (Surfactant 3)

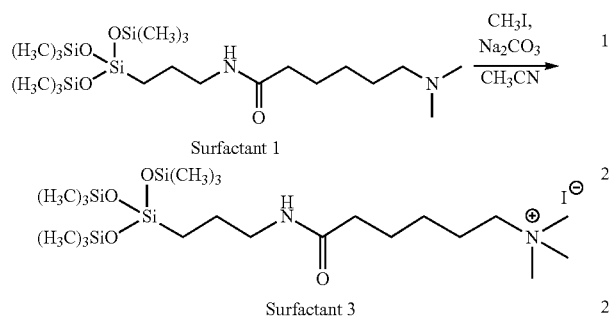

Surfactant 1 (1.00 g, 2.02 mmol, 1 equiv.) was dissolved in acetonitrile (10 mL) in a 100 mL round bottom flask. Next, Na$_2$CO$_3$ (0.26 g, 2.42 mmol, 1.2 equiv.) was added and the mixture was stirred for 10 minutes. Methyl iodide (0.377 mL, 6.06 mmol, 3 equiv.) was added and the reaction was heated at 40° C. for 24 hours. The cooled reaction mixture was filtered, and the solvent was removed under vacuum to give Surfactant 3 as a slightly yellow solid in quantitative yield. H NMR (500 MHZ, DMSO) δ 0.09 (s, 27H), 0.38-0.42 (m, 2H), 1.23-1.26 (m, 2H), 1.37-1.40 (m, 2H), 1.52-1.55 (m, 2H), 1.65-1.69 (m, 2H), 2.08 (t, J=7.4 Hz, 2H), 2.99 (dd, J=13, 6.9 Hz, 2H), 3.04 (s, 9H)), 3.24-3.33 (m, 2H).

The pure product is soluble in water and has surfactant properties. The halogen anions may be directly obtained from the N-alkylation reaction, and other desired counter anions may be obtained by anion exchange.

Example 2b

Determination of Physical Properties of Surfactant 3

Figure 2:
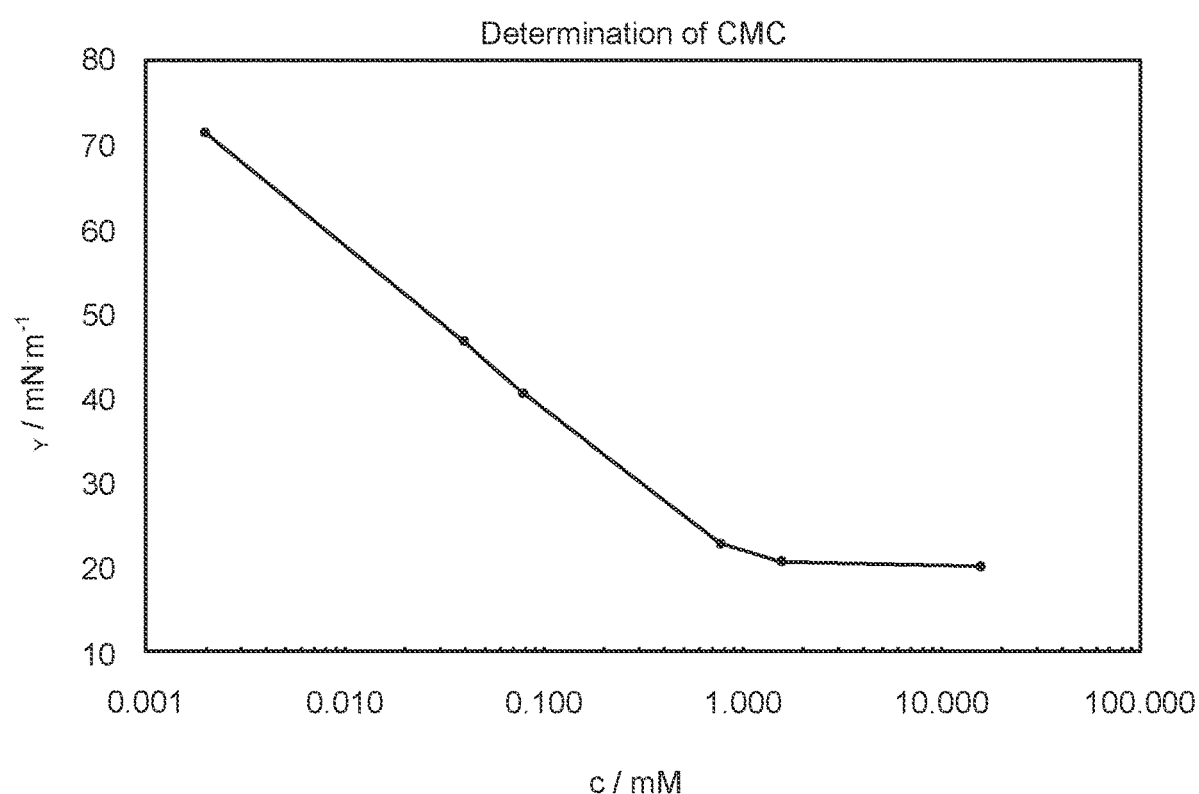
FIG. 2 shows a plot of surface tension versus concentration for Surfactant 3 as described in Example 2b.

The critical micelle concentration (CMC) for Surfactant 3 was measured. From the surface tension change with concentration in water, the CMC was determined to be about 1.6 mmol. The plateau value of minimum surface tension that can be reached by this surfactant is around 20 mN/m, indicating that the surfactant has outstanding interfacial activity. These results are plotted as surface tension versus concentration in FIG. 2.

Figure 3:
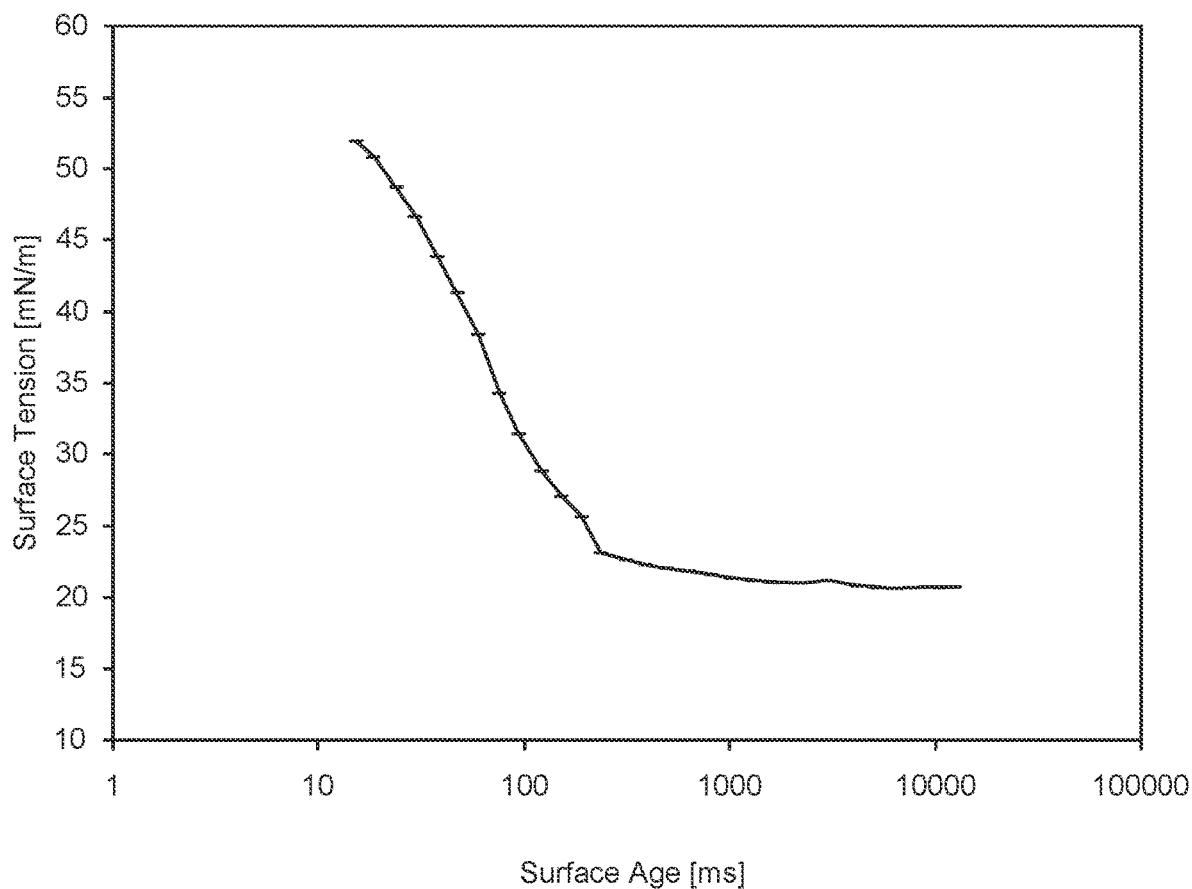
FIG. 3 shows a plot of dynamic surface tension as change in surface tension versus time for Surfactant 3 as described in Example 2b.

The dynamic surface tension of Surfactant 3 was determined with a bubble pressure tensiometer which measures the change of surface tension of a freshly created air-water interface with time. FIG. 3 shows a plot of the results as surface tension versus time and demonstrates that Surfactant 3 fully saturated the interface in less than 500 ms, making it exceptionally fast in terms of interfacial adsorption.

In addition to Surfactant 3's ability to lower both interfacial and surface tension, formulations containing only Surfactant have exceptional wetting properties. For example, hydrophobic substrates such as polyethylene and polypropylene exhibit a total surface wetting with a contact angle of 0°. On oleophobic and hydrophobic substrates such as Teflon, the measured contact angle was extremely low, 10.5° (Table 2).

TABLE 2

| Substrate | CA of Surfactant 3 (°) | Concentration | CA of water (°) |
| --- | --- | --- | --- |
| Teflon | 10.5 | 10× CMC | 119 |
| Polyethylene | 0 | 10× CMC | 91.5 |
| Polypropylene | 0 | 10× CMC | 93.3 |
| Nylon | 0 | 10× CMC | 50 |
| Polyethylene terephthalate | 0 | 10× CMC | 65.3 |

Example 3a

Synthesis of 6-((3-(1,1,1,5,5,5-hexamethyl-3-((trimethylsilyl)oxy)trisiloxan-3-yl)propyl)amino)-N,N-dimethyl-6-oxohexan-1-amine oxide (Surfactant 4)

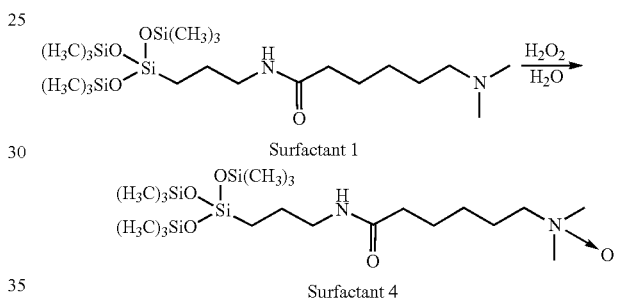

Surfactant 1 (1.00 g, 2.02 mmol, 1 equiv.) was added to distilled water (80 mL) in a 100 mL round bottom flask, followed by 50% hydrogen peroxide (1.15 mL, 20.2 mmol, 10 equiv.). The reaction was refluxed for 12 hours, then concentrated under vacuum. The residue was washed three times with acetone to give Surfactant 4 in 99% yield. $^1$H NMR (500 MHZ, DMSO) δ 0.09 (s, 27H), 0.38-0.44 (m, 2H), 1.21-1.25 (m, 2H), 1.35-1.42 (m, 2H), 1.50-1.55 (m, 2H), 1.71-1.75 (m, 2H), 2.05-2.08 (m, 2H), 2.97-3.00 (m, 2H), 3.01 (s, 9H), 3.11-3.14 (m, 2H).

Example 3b

Determination of Physical Properties of Surfactant 4

Figure 4:
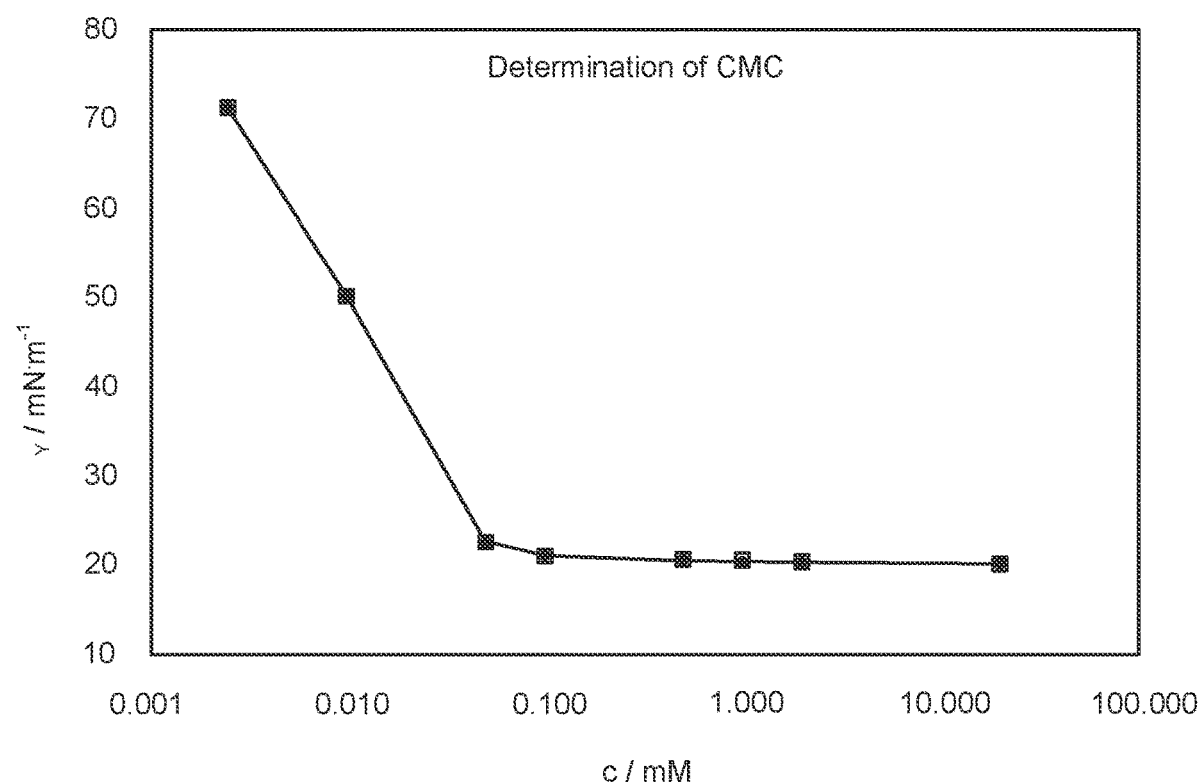
FIG. 4 shows a plot of surface tension versus concentration for Surfactant 4 as described in Example 3b.

The critical micelle concentration (CMC) for Surfactant 4 was measured. From the surface tension change with concentration in water, the CMC was determined to be about 0.49 mmol. The plateau value of minimum surface tension that can be reached by this surfactant is about 20 mN/m, indicating that the surfactant has outstanding interfacial activity. These results are plotted as surface tension versus concentration in FIG. 4.

Figure 5:
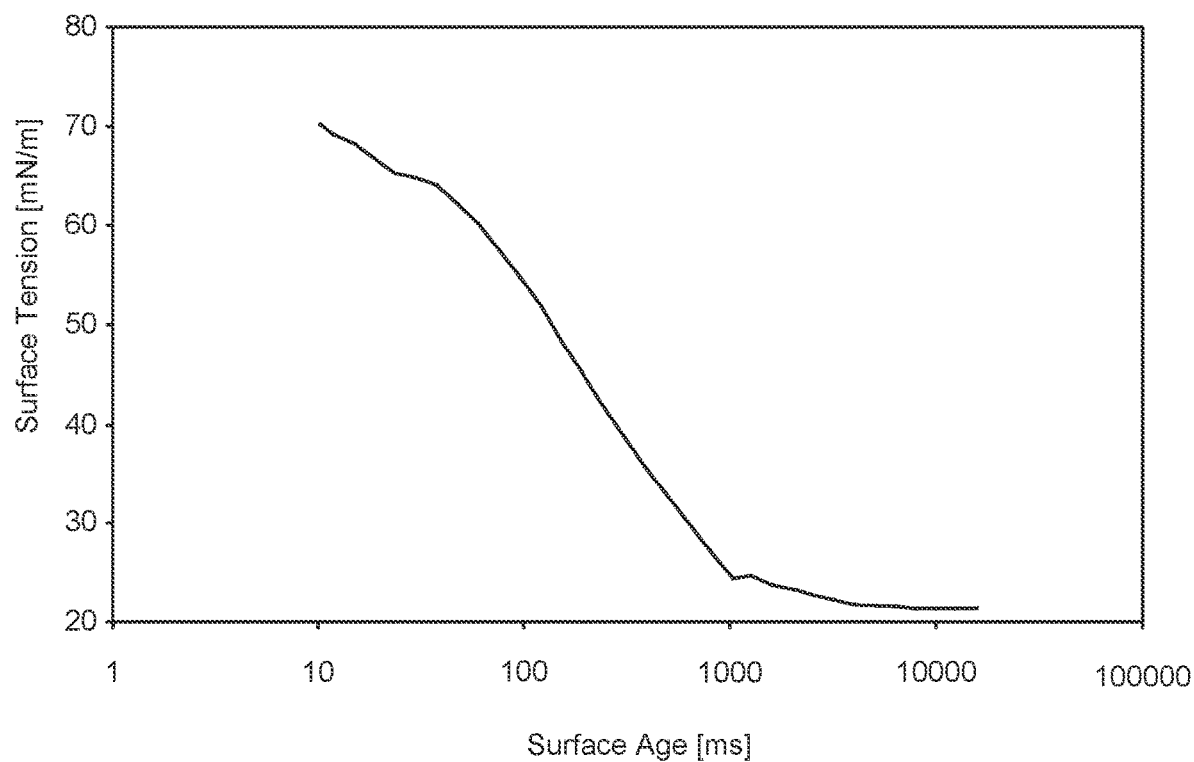
FIG. 5 shows a plot of dynamic surface tension as change in surface tension versus time for Surfactant 4 as described in Example 3b.

The dynamic surface tension of Surfactant 4 was determined with a bubble pressure tensiometer. FIG. 5 shows a plot of the results as surface tension versus time and demonstrates that Surfactant 4 fully saturated a freshly created air-water interface in one second or less, making it fast in terms of interfacial adsorption.

In addition to Surfactant 4's ability to lower both the interfacial and surface tension, formulations containing only Surfactant 4 in concentrations of 1-100×CMC have exceptional wetting properties. For example, a solution of Surfactant 4 in water at a concentration of 10×CMC exhibits a 0° contact angle on hydrophobic substrates such as polyethylene and polypropylene, and 10.6° on oleophobic and hydrophobic substrates such as Teflon. These contact angles are extremely low in comparison with the contact angle of water on the same substrate (Table 3).

TABLE 3

| Substrate | CA of Surfactant 4 (°) | Concentration | CA of water (°) |
| --- | --- | --- | --- |
| Teflon | 10.6 | 10× CMC | 119 |
| Polyethylene | 0 | 10× CMC | 91.5 |
| Polypropylene | 0 | 10× CMC | 93.3 |
| Nylon | 0 | 10× CMC | 50 |
| Polyethylene terephthalate | 0 | 10× CMC | 65.3 |

Example 4a

Synthesis of 4-((6-((3-(1,1,1,5,5,5-hexamethyl-3-((trimethylsilyl)oxy)trisiloxan-3-yl)propyl)amino)-6-oxohexyl)dimethylammonio)butane-1-sulfonate (Surfactant 5)

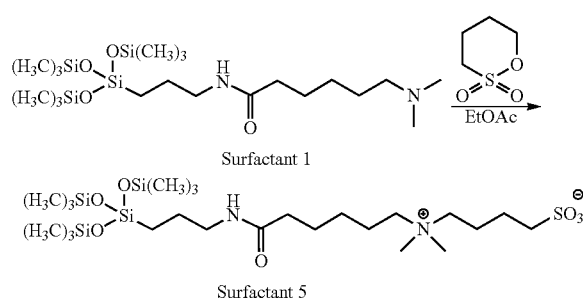

Surfactant 1 (1.00 g, 2.02 mmol, 1 equiv.) was added to ethyl acetate (EtOAc) (30 mL) in a 100 mL round bottom flask, followed by 1,2-butane sultone (0.27 mL, 2.2 mmol, 1.1 equiv.). The reaction was refluxed for 12 hours, after which the solvent was removed and the resultant white waxy solid was washed with acetone to give Surfactant 5 in 50% yield. 1H NMR (500 MHZ, DMSO) δ 0.10 (s, 27H), 0.38-0.46 (m, 2H), 1.23-1.27 (m, 2H), 1.37-1.68 (m, 10H), 1.73-1.78 (m, 2H), 2.45-2.48 (m, 2H), 2.97-3.01 (m, 8H), 3.18-3.21 (m, 2H), 3.23-3.27 (m, 2H).

Example 4b

Determination of Physical Properties of Surfactant 5

Figure 6:
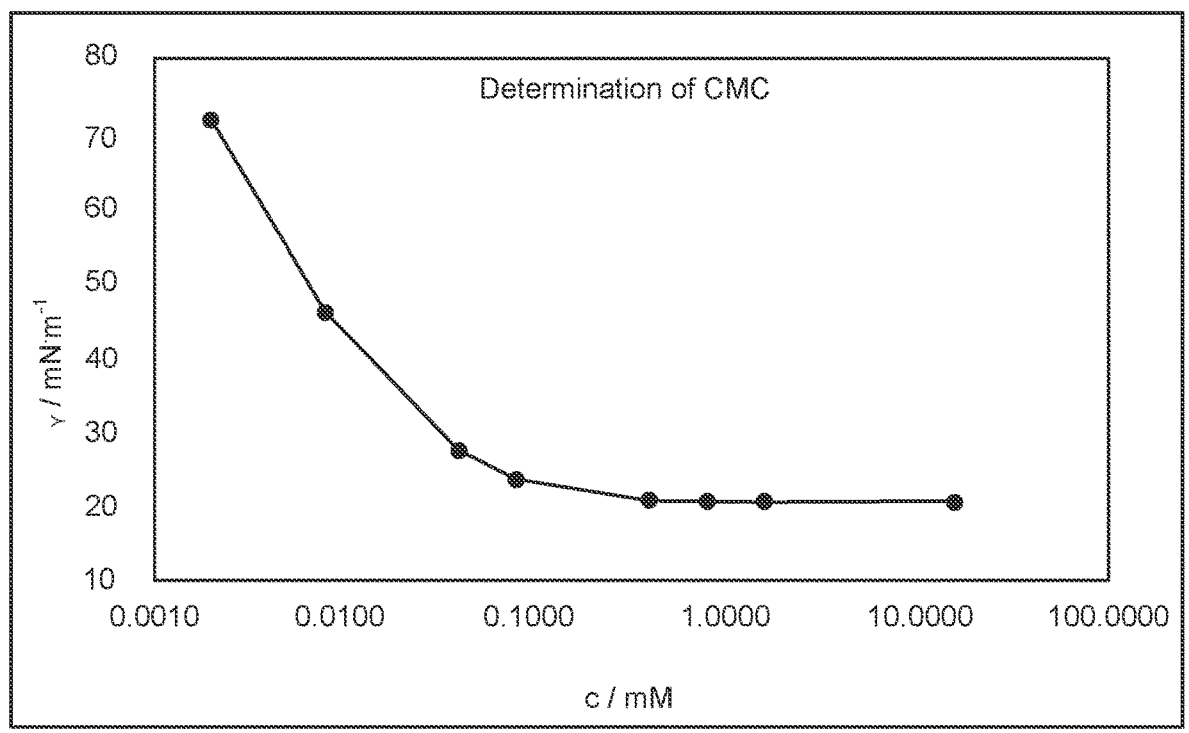
FIG. 6 shows a plot of surface tension versus concentration for Surfactant 5 as described in Example 4b.

The critical micelle concentration (CMC) for Surfactant 5 was measured. From the surface tension change with concentration in water, the CMC was determined to be about 0.39 mmol. The plateau value of minimum surface tension that can be reached by this surfactant is about 21 mN/m, indicating that the surfactant has outstanding interfacial activity. These results are plotted as surface tension versus concentration in FIG. 6.

Figure 7:
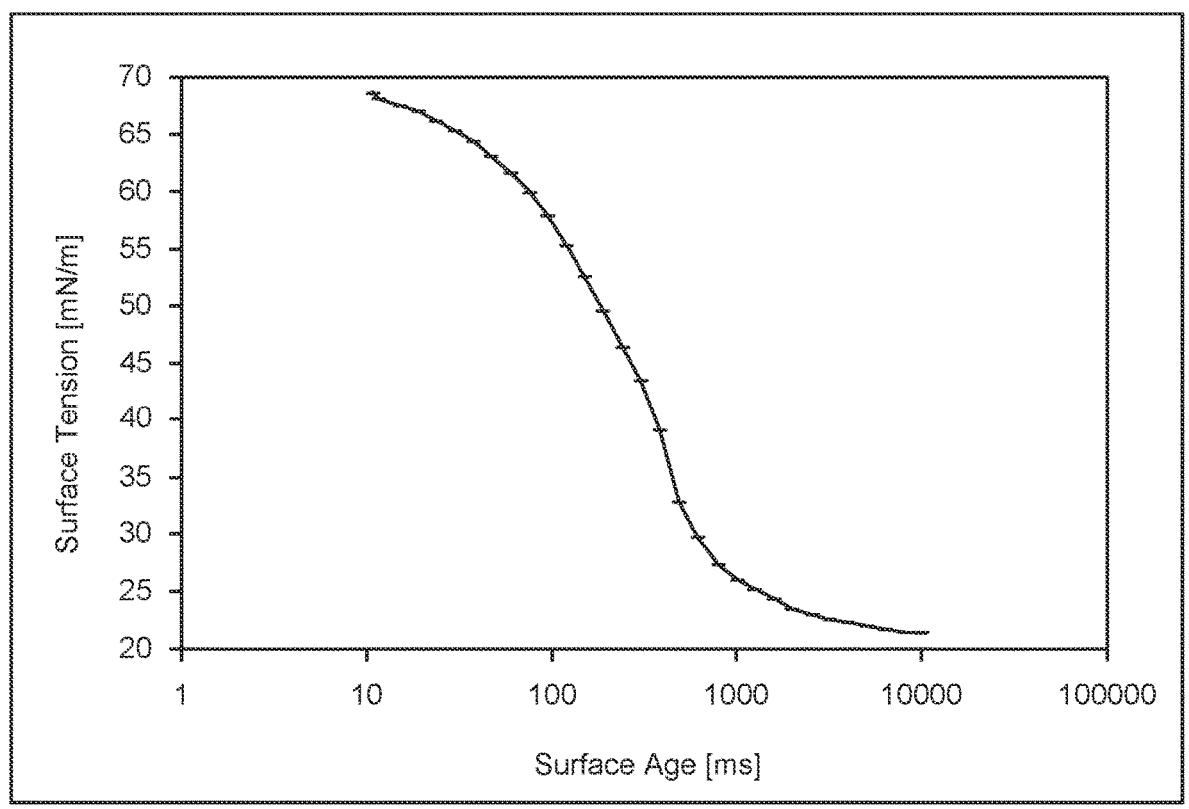
FIG. 7 shows a plot of dynamic surface tension as change in surface tension versus time for Surfactant 5 as described in Example 4b.

The dynamic surface tension of Surfactant 5 was determined with a bubble pressure tensiometer. FIG. 7 shows a plot of the results as surface tension versus time and demonstrates that Surfactant 5 fully saturated a freshly created air-water interface in one second or less, making it fast in terms of interfacial adsorption.

Finally, a solution of Surfactant 5 in water at a concentration of 10×CMC exhibits a 0° contact angle on hydrophobic substrates such as polyethylene and polypropylene, and 10.2° on oleophobic and hydrophobic substrates such as Teflon. These contact angles are extremely low in comparison with the contact angle of water on the same substrate (Table 4).

TABLE 4

| Substrate | CA of Surfactant 5 (°) | Concentration | CA of water (°) |
| --- | --- | --- | --- |
| Teflon | 10.2 | 10× CMC | 119 |
| Polyethylene | 0 | 10× CMC | 91.5 |
| Polypropylene | 0 | 10× CMC | 93.3 |
| Polyethylenterephthalate | 0 | 10× CMC | 65.3 |
| Nylon | 0 | 10× CMC | 50 |
| Polyethylene-HD | 0 | 10× CMC | 93.6 |

Example 5

Formulation for Shampoo

In this Example, a formulation for use as a shampoo is provided. This formulation is useful in in providing hair with a smooth and silky feel. The components of the formulation are shown below in Table 4. Additionally, the formulation may include other natural oils and ingredients, as well as vitamins for consumer appeal, in an amount of less than 1 wt. %.

TABLE 4

| Component | Function | Weight % |
| --- | --- | --- |
| Surfactant 5 | Surfactant | 0.1-10 |
| Ammonium lauryl sulfate | Foaming agent | 10-25 |
| Cocamidopropyl betaine | Co-surfactant | 0.1-5 |
| Cocamide diethanolamine | Foam booster | 1-4 |
| Xantan gum or acrylate copolymer | Thickener/ rheology modifier | 0-5 |
| Citric acid | pH stabilizer | 0.1-0.3 |
| Fragrance | | 0.02-0.1 |
| Water | | 49.5-89 |

Example 6

Formulation for Hair Conditioner

In this Example, a formulation for use as a hair conditioner is provided. This formulation may be used to replace or reduce polyquaternium-10, polyquaternium-7 and dimethicone oils, while preserving the easy combability and silky-soft feel that hair conditioners provide. The formulation is shown below in Table 5.

TABLE 5

| Component | Function | Weight % |
| --- | --- | --- |
| Surfactant 3 | Surfactant | 1-10 |
| Surfactant 5 | Surfactant | 0.1-10 |
| Sodium cumene sulfonate | Hydrotrope | 1-3 |
| Ammonium lauryl sulfate | Surfactant | 0.1-6 |
| Ammonium laureth-3 sulfate | Surfactant | 0.1-6 |
| Cocoamide diethanolamine | Foaming agent | 0.5-2 |
| PEG-55 propylene glycol oleate | Emulsifier | 0.01-1 |
| Fragrance | | 0.02-0.1 |
| Water | | 61.9-97.2 |

Example 7

Formulation for Car Washing Detergents for Removal of Difficult Spots from the Surface In this Example, a formulation for use car washing detergents for removal of difficult spots from the surface is provided. The formulation is shown below in Table 6.

TABLE 6

| Component | Function | Weight % |
|---|---|---|
| Surfactant 5 | Surfactant | 0.1-10 |
| Dodecyl benzene sulfonic acid or Ammonium lauryl sulfate | Foaming/ detersive agent | 5-14 |
| Monoethanolamine, diethanolamine, or triethanolamine | pH stabilizer | <0.5 |
| Cocoamide diethanolamine | Foam stabilizer | 0.1-2 |
| Propylene glycol | Solubilizing agent | 0.05-1.6 |
| Fragrance | | 0.02-0.1 |
| Coloring agent | | 0-0.1 |
| Water | | 71.6-95.0 |

Example 8

Formulation for a Spot-Free Rinsing or Drying Solution

In this Example, a formulation a spot-free rinsing or drying solution is provided. The solution may be applied to the windows or body of a car after the main wash is complete. The formulation is shown below in Table 7.

TABLE 7

| Component | Function | Weight % |
|---|---|---|
| Surfactant 5 | Surfactant | 0.001-2 |
| Water | | 98-99.999 |

Example 9

Formulation for a Heavy-Duty Carpet Cleaner

In this Example, a formulation for a heavy-duty carpet cleaner is provided. The cleaner is a high-foaming deep cleaner. The formulation is shown below in Table 8.

TABLE 8

| Component | Function | Weight % |
|---|---|---|
| Surfactant 4 | Surfactant | 1-15 |
| Dodecyl benzene sulfonic acid or Ammonium lauryl sulfate | Foaming/ detersive agent | 0.001-10 |
| Sodium cumene sulfonate | Hydrotrope | 0.001-3 |
| Monoethanolamine, diethanolamine, or triethanolamine | pH stabilizer | 0.01-1 |
| Water | | 74.95-99 |

Example 10

Formulation for a Heavy-Duty Surface Cleaner

In this Example, a formulation for a heavy-duty surface cleaner is provided. This cleaner may be used for manual or automated surface cleaning machines. The formulation is shown below in Table 9.

TABLE 9

| Component | Function | Weight % |
|---|---|---|
| Surfactant 4 | Surfactant | 0.001-25 |
| Dodecyl benzene sulfonic acid or Ammonium lauryl sulfate | Foaming/ detersive agent | 0.001-10 |
| Sodium cumene sulfonate | Hydrotrope | <0.5 |
| Propylene glycol | Solubilizing agent | 0.01-5 |
| Water | | 59.5-99.99 |

Example 11

Formulation for a Concentrated Graffiti Removal Detergent

In this Example, a formulation for a concentrated graffiti removal detergent is provided. The detergent may be used in a high-pressure hose. The formulation is shown below in Table 10.

TABLE 10

| Component | Function | Weight % |
|---|---|---|
| Surfactant 4 | Surfactant | 0.001-15 |
| Surfactant 5 | Co-wetting agent | 0.001-10 |
| Sodium cumene sulfonate | Hydrotrope | 0.001-3 |
| Propylene glycol | Solubilizing agent | 0.01-5 |
| Water | | 67-99.99 |

Example 12

Formulation for a Wetting Agent in Aerosol Sprays

In this Example, a formulation for a wetting agent adjuvant in aerosol sprays is provided. The aerosol sprays may be used to apply pesticides or other crop protecting agents. The provided formulation aims to reduce the amount of surfactant chemicals in pesticide and crop protection (typically between 2-5%) by providing better performance through excellent wetting and low CMC, thus providing a greener option. The formulation is shown below in Table 11.

TABLE 11

| Component | Function | Weight % |
|---|---|---|
| Surfactant 2, 4, or 5 | Co-wetting agent | 0.001-2 |
| Pesticide and/or other crop protection agent(s) | | 0.1-10 |
| Water | | 88-99.899 |

Example 13

Formulation of Additives for Aerosol Spray Paint

In this Example, a formulation for an additive for a water-based aerosol spray paint or coating is provided. The formulation aims to provide good dynamic wetting of aerosol droplets on surfaces upon application, thus preventing paint cratering and other such problems. The formulation is shown below in Table 12.

TABLE 12

| Component | Function | Weight % |
|---|---|---|
| Surfactant 4 or 5 | Wetting agent/flow leveling agent/ slip control agent | 0.001-5 |

TABLE 12-continued

| Component | Function | Weight % |
|---|---|---|
| Gas propellent | Propellant | 5-30 |
| Oil-in-water emulsion | Pigmentation | 0.1-25 |
| Tamol 731A | Dispersant agent | 1-4 |
| Isopropanol (97-99% purity) | Solvent/carrier | 7-15 |
| Efka SI2022 or SI 2723 | Anti-foaming agent | 0.001-2 |
| Water | | 19-86.9 |

ASPECTS

Aspect 1 is a compound of Formula I:

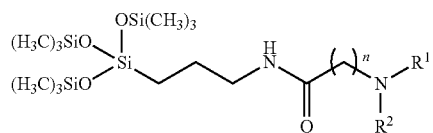

Formula I wherein $R^1$ and $R^2$ may be the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

n is an integer from 1 to 12;

the terminal nitrogen is optionally further substituted with $R^3$, wherein $R^3$ is selected from the group consisting of hydrogen, oxygen, hydroxyl, and $C_1$-$C_6$ alkyl; and an optional counterion may be associated with the compound and, if present, the counterion may be selected from the group consisting of chloride, bromide, and iodide.

Aspect 2 is the compound of Aspect 1 represented by Formula Ia:

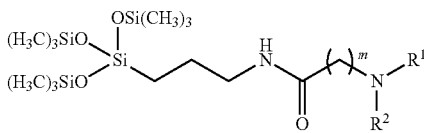

Formula Ia wherein $R^1$ and $R^2$ may be the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

m is an integer from 1 to 6;

the terminal nitrogen is optionally further substituted with $R^3$, wherein $R^3$ is selected from the group consisting of hydrogen, oxygen, and $C_1$-$C_6$ alkyl wherein the alkyl chain is optionally substituted with one or more substituents selected from the group consisting of carboxyl, carboxylate, and sulfonate; and an optional counterion may be associated with the compound and, if present, the counterion may be selected from the group consisting of chloride, bromide, and iodide.

Aspect 3 is the compound of either of Aspects 1 or 2 represented by Formula Ib:

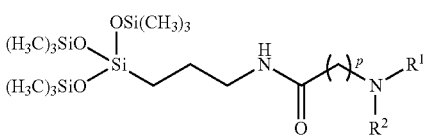

Formula Ib wherein $R^1$ and $R^2$ may be the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

p is 5;

the terminal nitrogen is optionally further substituted with $R^3$, wherein $R^3$ is selected from the group consisting of hydrogen, oxygen, and $C_1$-$C_6$ alkyl, wherein the alkyl chain is optionally substituted with one or more substituents selected from the group consisting of carboxyl, carboxylate, and sulfonate; and an optional counterion may be associated with the compound and, if present, the counterion may be selected from the group consisting of chloride, bromide, and iodide.

Aspect 4 is the compound of any of Aspects 1-3, wherein $R^1$ and $R^2$ are methyl.

Aspect 5 is the compound of Aspect 1, wherein n is 5.

Aspect 6 is the compound of any of Aspects 1-5, wherein $R^3$ is hydrogen.

Aspect 7 is the compound of any of Aspects 1-6, wherein the counterion is selected from the group consisting of chloride, bromide, and iodide.

Aspect 8 is the compound of Aspect 7, wherein the counterion is chloride.

Aspect 9 is the compound of any of Aspects 1-5, wherein $R^3$ is methyl.

Aspect 10 is the compound of Aspect 9, wherein the counterion is selected from the group consisting of chloride, bromide and iodide.

Aspect 11 is the compound of Aspect 10, wherein the counterion is iodide.

Aspect 12 is the compound of any of Aspects 1-5 wherein $R^3$ is an oxygen atom.

Aspect 13 is the compound of any of Aspects 1-5, wherein $R^3$ is $C_1$-$C_6$ alkyl substituted with a terminal sulfonate.

Aspect 14 is the compound of any of Aspects 1-3, wherein the compound is 6-(dimethylamino)-N-(3-(1,1,1,5,5,5-hexamethyl-3-((trimethylsilyl)oxy)trisiloxan-3-yl)propyl) hexanamide, having the following formula:

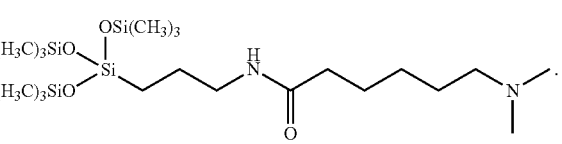

Aspect 15 is the compound of any of Aspects 6-8, wherein the compound is 6-(dimethylamino)-N-(3-(1,1,1,5,5,5-hexamethyl-3-((trimethylsilyl)oxy)trisiloxan-3-yl)propyl)hexaminium chloride, having the following formula:

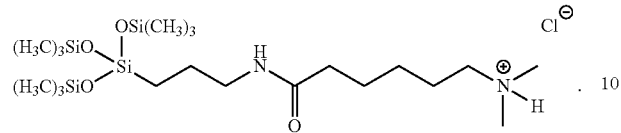

Aspect 16 is the compound of any of Aspects 9-11, wherein the compound is 3 6-((3-(1,1,1,5,5,5-hexamethyl-3-((trimethylsilyl)oxy)trisiloxan-3-yl)propyl)amino)-N,N,N-trimethyl-6-oxohexan-1-aminium iodide, having the following formula:

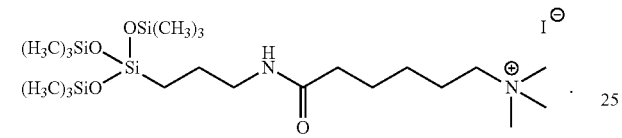

Aspect 17 is the compound of Aspect 12, wherein the compound is 6-((3-(1,1,1,5,5,5-hexamethyl-3-((trimethylsilyl)oxy)trisiloxan-3-yl)propyl)amino)-N,N-dimethyl-6-oxohexan-1-amine oxide, having the following formula:

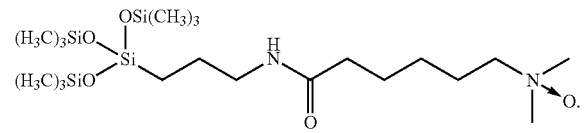

Aspect 18 is the compound of Aspect 13, wherein the compound is 4-((6-((3-(1,1,1,5,5,5-hexamethyl-3-((trimethylsilyl)oxy)trisiloxan-3-yl)propyl)amino)-6-oxohexyl)dimethylammonio)butane-1-sulfonate, having the following formula:

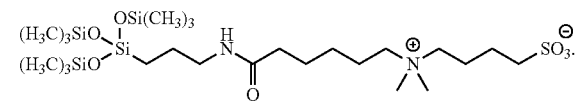

Aspect 19 is the compound of Aspect 13, wherein the compound is 5-((6-((3-(1,1,1,5,5,5-hexamethyl-3-((trimethylsilyl)oxy)trisiloxan-3-yl)propyl)amino)-6-oxohexyl)dimethylammonio)pentane-1-sulfonate, having the following formula:

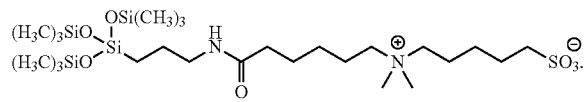

The invention claimed is:

1. A liquid medium, comprising:
   water; and
   a compound of Formula I:

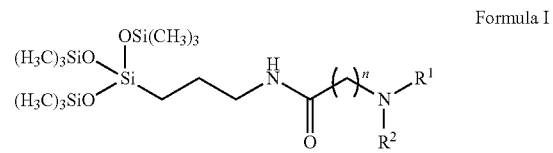

Formula I wherein $R^1$ and $R^2$ may be the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;
   n is an integer from 3 to 12;
   the terminal nitrogen is optionally further substituted with $R^3$, wherein $R^3$ is selected from the group consisting of hydrogen, oxygen, hydroxyl, and $C_1$-$C_6$ alkyl; and
   an optional counterion associated with the compound which, if present, is selected from the group consisting of chloride, bromide, and iodide.

2. The liquid medium of claim 1, wherein $R^1$ and $R^2$ are methyl.

3. The liquid medium of claim 1, wherein n is 5.

4. The liquid medium of claim 3, wherein $R^3$ is hydrogen.

5. The liquid medium of claim 4, wherein the counterion is selected from the group consisting of chloride, bromide, and iodide.

6. The liquid medium of claim 5, wherein the counterion is chloride.

7. The liquid medium of claim 3, wherein $R^3$ is methyl.

8. The liquid medium of claim 7, wherein the counterion is selected from the group consisting of chloride, bromide, and iodide.

9. The liquid medium of claim 8, wherein the counterion is iodide.

10. The liquid medium of claim 3, wherein $R^3$ is an oxygen atom.

11. The liquid medium of claim 3, wherein $R^3$ is $C_1$-$C_6$ alkyl, substituted with sulfonate.

12. The liquid medium of claim 3, wherein the compound is 6-(dimethylamino)-N-(3-(1,1,1,5,5,5-hexamethyl-3-((trimethylsilyl) oxy) trisiloxan-3-yl) propyl) hexanamide, having the following formula:

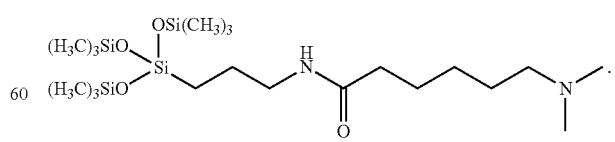

13. The liquid medium of claim 6, wherein the compound is 6-(dimethylamino)-N-(3-(1,1,1,5,5,5-hexamethyl-3-((trimethylsilyl) oxy) trisiloxan-3-yl) propyl) hexaminium chloride, having the following formula:

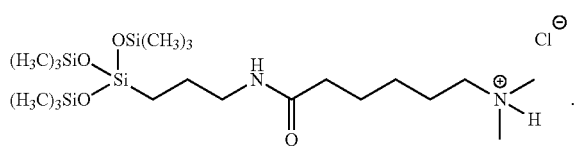

14. The liquid medium of claim 9, wherein the compound is 3 6-((3-(1,1,1,5,5,5-hexamethyl-3-((trimethylsilyl) oxy) trisiloxan-3-yl) propyl) amino)-N,N,N-trimethyl-6-oxo-hexan-1-aminium iodide, having the following formula:

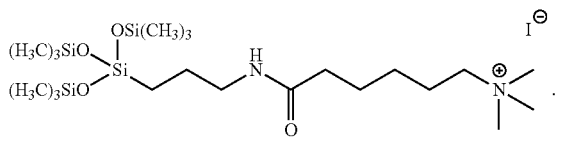

15. The liquid medium of claim 10, wherein the compound is 6-((3-(1,1,1,5,5,5-hexamethyl-3-((trimethylsilyl) oxy) trisiloxan-3-yl) propyl) amino)-N,N-dimethyl-6-oxo-hexan-1-amine oxide, having the following formula:

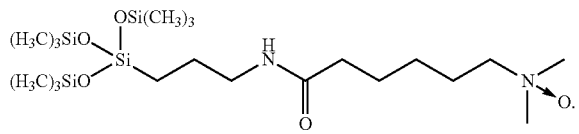

16. The liquid medium of claim 11, wherein the compound is 4-((6-((3-(1,1,1,5,5,5-hexamethyl-3-((trimethylsilyl) oxy) trisiloxan-3-yl) propyl) amino)-6-oxohexyl) dimethylammonio) butane-1-sulfonate, having the following formula:

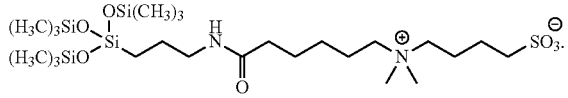

17. The liquid medium of claim 11, wherein the compound is 5-((6-((3-(1, 1,1,5,5,5-hexamethyl-3-((trimethylsilyl) oxy) trisiloxan-3-yl) propyl) amino)-6-oxohexyl) dimethylammonio) pentane-1-sulfonate, having the following formula:

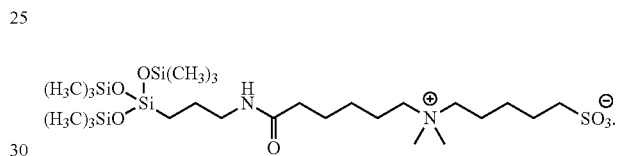

* * * * *